No. 662,001. Patented Nov. 20, 1900.
E. B. KLINE.
FEED REGULATING MECHANISM FOR THRESHING MACHINES.
(Application filed Apr. 14, 1900.)
(No Model.)
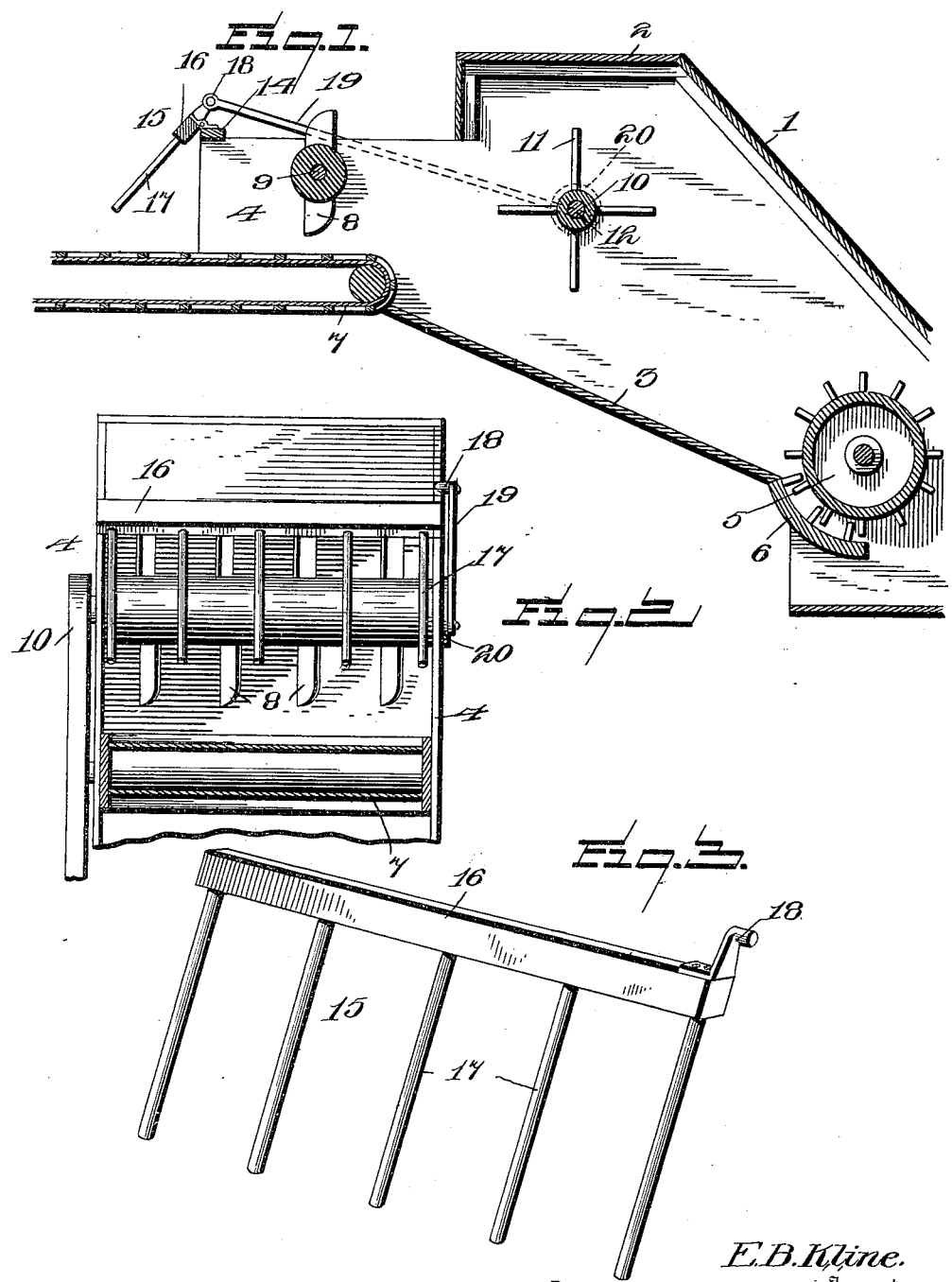
E. B. Kline.
Inventor
Witnesses

UNITED STATES PATENT OFFICE.

ED B. KLINE, OF LAUREL, KANSAS.

FEED-REGULATING MECHANISM FOR THRESHING-MACHINES.

SPECIFICATION forming part of Letters Patent No. 662,001, dated November 20, 1900.

Application filed April 14, 1900. Serial No. 12,887. (No model.)

*To all whom it may concern:*

Be it known that I, ED B. KLINE, a citizen of the United States, residing at Laurel, in the county of Hodgeman and State of Kansas, have invented a new and useful Feed-Regulating Mechanism for Threshing-Machines, of which the following is a specification.

My invention relates to feed-regulating mechanism for threshing-machines; and the object in view is to provide means for guarding the band-cutter in a manner to prevent the choking of the feed-opening defined between the cutter-shaft and the conveyer therebelow.

To the attainment of the desired end my invention consists in mounting an oscillatory regulator guard or rake immediately in front of the band-cutters and in such operative proximity to the conveyer as will cause its engagement with the sheaves of grain and prevent their presentation to the band-cutters in such quick succession or in such disordered arrangement as would serve to choke the feed-opening, and thereby retard the effective operation of the cutters.

The invention further consists in the specific construction and arrangement hereinafter more fully described, illustrated in the accompanying drawings, and succinctly pointed out in the appended claim.

In said drawings, Figure 1 is a fragmentary sectional view of a threshing-machine, showing the feed and cutter box and illustrating the application of my invention. Fig. 2 is a front elevation of the subject-matter of Fig. 1, and Fig. 3 is a detail perspective view of the oscillatory regulator guard or rake detached.

Referring to the numerals of reference employed to designate corresponding parts in the several views, 1 indicates the feed and cutter box of an ordinary threshing-machine, comprising a hood 2, an inclined bottom wall or chute 3, and forwardly-extending side walls 4, which constitute the cutter-box or throat of the machine.

5 indicates one of the threshing-cylinders, and 6 is a portion of its concave located at the lower end of the chute 3 and illustrated merely for the purpose of making plain the relation of my device to the structure of the threshing-machine. Located at the bottom of the cutter-box 4 and extending forwardly a suitable distance for the reception of the sheaves is the usual endless conveyer 7, which presents the sheaves to the band-cutters 8, located slightly above the conveyer and carried in series by a cutter-shaft 9, extending transversely across the frame and journaled at its opposite ends in the walls 4 of the cutter-box. The band-cutter, comprising the shaft and cutters, is rotated in any suitable manner—as, for instance, by a power-belt 10, passed around some operative element of a thresher—for the purpose of presenting the knives or cutters 8 to the bands of the sheaves as the latter are fed into the machine by the conveyer 7. Located in the feed-box above the chute 3 and in such proximity thereto as to engage and beat down or distribute the grain as it passes from the conveyer is a rotary beater 10, provided with radial tines 11, mounted on a beater-shaft 12, journaled in the side walls of the feed-box. This aggroupment of elements is well known, and it will be seen that as the sheaves are presented to the cutters by the conveyer 7 they are compelled to pass between the conveyer and band-cutter, which devices, in conjunction with the walls 4 of the cutter-box, define the feed-opening of the threshing-machine.

I have found in practice that this opening, which, as is well understood, is traversed by the knives of the cutter, is apt to become choked if the sheaves are presented too rapidly or in such disorder as to make the effective operation of the knives impossible. This choking of the feed-opening, if continued, constitutes a constant impediment to the operation of the band-cutter and not only prevents the effective operation of the cutters to sever the bands of the sheaves, but actually prevents the rotation of the cutter-shaft and in some instances may serve to cause breakage of the knives or their mounting. It is for the purpose of preventing this choking of the feed-opening and to insure a properly-timed orderly feed of the sheaves to the band-cutter that my device has been contrived.

14 indicates a slat or beam extended across the top of the cutter-box at its front end, and to this beam is hinged or otherwise pivotally connected my regulator, guard, or rake 15, comprising a bar 16, longitudinally coextensive with the transverse dimension of the conveyer and carrying a series of parallel tines or teeth 17 of sufficient length to bring their lower ends into effective proximity to the sheaves fed into the machine by the conveyer 7. At one end of the bar 16 is mounted a crank 18, to which is connected a pitman 19, extending rearwardly and eccentrically connected to the regulator-actuating wheel 20, keyed or otherwise secured upon the beater-shaft 12 and preferably outside of and adjacent to one of the side walls of the feed-box.

The operation of my device is as follows: Motion being imparted to the elements of the threshing-machine, the band-cutter, beater, and threshing-cylinders will be rotated. The rotation of the beater-shaft will, through the wheel 20 and pitman 19, effect the oscillation of the guard or regulator 17, located, as stated, immediately in front of the band-cutter, or, in other words, in a position to guard the feed-opening into the machine. As the sheaves are fed toward the cutter upon the conveyer 7 the lower ends of the teeth 17 when in their depressed positions will engage the grain and retard the movement of the sheaf toward the cutter. As the regulator oscillates the teeth will be elevated to permit the sheaf to pass to the cutter; but the return movement of the teeth 17 will cause their engagement with the next succeeding sheaf and will retard it sufficiently to permit the first sheaf to pass the cutter or at least to have its band cut before the next sheaf is presented to the knives. In this manner the passage of the sheaves to the band-cutter is regulated, even supposing said sheaves to be placed upon the conveyer in orderly arrangement; but it will be observed that if the sheaves are thrown upon the conveyer 7 in more or less disorder the regulator will act as a guard and will cause the uppermost sheaves to be thrown back from the feed-opening until they are arranged in such order as will permit them to pass in proper succession under the guard for presentation to the cutters.

I am aware that various forms of spreading devices have been employed for the purpose of properly distributing the grain over the surface of a conveyer for threshing-machines and that fixed regulators have been mounted immediately in advance of the cutters of such machines, also that movable kickers have been mounted above the feed-opening of a threshing-machine for the purpose of regulating the feed of the sheaves, and such devices I do not claim.

What I do claim is—

The combination with the feed-throat of a threshing-machine, of a conveyer delivering the sheaves to said throat, a band-cutter located above and adjacent to the delivery end of said conveyer, a guard or cut-off located over the conveyer at a short distance in front of the band-cutter, and means for causing said guard to oscillate toward and from the conveyer and thereby alternately intercept the sheaves and leave an opening for their passage to the band-cutter.

In testimony that I claim the foregoing as my own I have hereto affixed my signature in the presence of two witnesses.

ED B. KLINE.

Witnesses:
WM. SINCLAIR,
WILLIAM E. WILKINSON.